UNITED STATES PATENT OFFICE

PAUL ASKENASY, OF KARLSRUHE, GERMANY, ASSIGNOR TO THE FIRM SOCIETY OF CHEMICAL INDUSTRY IN BASLE, OF BASEL, SWITZERLAND

PRODUCTION OF ACETYLENE

No Drawing. Application filed July 25, 1929, Serial No. 381,100, and in Germany August 4, 1928.

My invention relates to a process for separating acetylene in a concentrated form from gas mixtures which are poor in acetylene and contain besides acetylene and ethylene considerable quantities of both methane, hydrogen, and at least traces of nitrogen.

In the synthetic production of acetylene and ethylene from mixtures of methane and hydrogen by a thermal method, for example by partial combustion of methane, or in a flaming arc, there are obtained on the average mixtures of gases having a content of acetylene amounting to 2–6 per cent. or slightly more, the bulk consisting mainly of methane and hydrogen. From such mixtures the acetylene has to be separated in concentrated form in order, on the one hand to obtain a useful production and on the other hand to obtain a residual gas as free as possible from acetylene, so that it may, if necessary after enrichment in methane, be used again for making acetylene.

I have found that a very thorough separation of acetylene from gas mixtures being poor in acetylene and containing, besides acetylene and ethylene, considerable proportions of both methane and hydrogen, may be effected by the following method:

The acetylene may be removed from the mixture of gases in known manner by means of active carbon or some other active absorbent, from which the concentrated acetylene may be subsequently separated by heat, steam or the like, as well as by pumping.

The active adsorbent saturated in respect to acetylene and containing at the same time ethylene, methane, hydrogen and at least traces of nitrogen is first evacuated in the cold. By this measure only methane and hydrogen are dispelled from it, without loss of acetylene. The heat is applied to the adsorbent and evacuation is repeated whereby a gas consisting mainly of acetylene is liberated.

The following example illustrates the invention:—

A gas mixture consisting of 2–4 per cent. of acetylene, a small proportion of ethylene, 30 per cent. of methane and for the rest hydrogen, is passed through activated charcoal. By using a suitably activated charcoal at ordinary temperature there is adsorbed from the mixture of gases acetylene amounting to about 5 times the apparent volume of the charcoal together with methane and hydrogen. As soon as the adsorptive power of the charcoal for acetylene has become exhausted, which will be recognized by a sudden rise in the percentage of acetylene in the gases leaving the adsorption apparatus, the rise amounting from some 10ths of a per cent. to the proportion of acetylene in the entering gases, the passage of the gas mixture is interrupted and the adsorption apparatus exhausted in the cold, whereby a great part of the methane and hydrogen absorbed are withdrawn containing only traces of acetylene and may be collected in a gas holder. The apparatus is then connected with another gas holder, the vacuum pump stopped and the charcoal heated. The heating may be by external application or by a circulation of the hot acetylene itself or in any other manner. The pressure rises gradually from a few millimetres to atmospheric pressure or even somewhat higher. The apparatus is then again evacuated, or the evacuation may accompany the heating and the charcoal is finally exhausted at about 100° C. The total concentration of the acetylene thus obtained amounts to 50 per cent. The charcoal is now after cooling subjected again to passage of gaseous mixture of the original composition and the process begins again. By repetition of the process with the already enriched acetylene and ethylene a quite concentrated acetylene can be obtained with the use of very little charcoal.

By this new method of repeated evacuation at different temperatures it is possible to obtain with surprising completeness the separation of the acetylene, in a concentration of 50 per cent. and over, from the rest of the gases, as practically all the acetylene is present in a concentrated form. The residual mixture of gases which is nearly free from acetylene, may be used, for example, again in a circuit process for synthesizing acetylene.

It may be advantageous to conduct the adsorption of the acetylene by the activated charcoal at a temperature below that given in the example, whereby the proportion of adsorbed acetylene may be quite essentially increased. For example, at −40° C. the adsorption of the acetylene is about 6 times that which occurs at the ordinary temperature. In this case also the acetylene behaves as described above during the exhausting operation, that is to say it is obtained only after application of heat or by pumping at a raised temperature, but in this case the acetylene is of higher concentration, amounting indeed to over 80 per cent.

Obviously instead of active charcoal other active adsorbents, such as kieselguhr, may be used.

The invention provides for the practical recovery without loss of acetylene and ethylene from all gas mixtures which besides acetylene and ethylene contain methane, hydrogen and, it may be, also nitrogen.

The process may be used, for example, in combination with that of U. S. A. Patent No. 1,547,714.

What I claim is:—

1. A process for separating acetylene in a concentrated form from gas mixtures which are poor in acetylene and contain, besides acetylene and ethylene, considerable proportions of both methane and hydrogen and at least traces of nitrogen, which process consists in passing said gas mixture through an active adsorbent, subjecting the active adsorbent, saturated in respect of acetylene and containing besides considerable proportions of methane and some hydrogen, to an evacuation in the cold, whereby chiefly methane and hydrogen are separated from the adsorbent without substantial loss of acetylene, and then heating the active adsorbent and again evacuating for the purpose of expelling the adsorbed acetylene in a high degree of concentration.

2. A process for separating acetylene in a concentrated form from gas mixtures which are poor in acetylene and contain, besides acetylene and ethylene, considerable proportions of both methane and hydrogen and at least traces of nitrogen, which process consists in passing said gas mixture through activated carbon, subjecting the activated carbon, saturated in respect of acetylene and containing besides considerable proportions of methane and some hydrogen, to an evacuation in the cold, whereby chiefly methane and hydrogen are separated without substantial loss of acetylene, and then heating the active carbon and again evacuating for the purpose of expelling the adsorbed acetylene in a high degree of concentration.

In witness whereof I have hereunto signed my name this 12th day of July, 1929.

PAUL ASKENASY.